(12) United States Patent
Xiao et al.

(10) Patent No.: US 9,161,124 B2
(45) Date of Patent: Oct. 13, 2015

(54) METHOD AND ELECTRONIC DEVICE FOR DETERMINING HEADSET LINE SEQUENCE

(71) Applicant: Huawei Device Co.,Ltd., Shenzhen (CN)

(72) Inventors: Wenchao Xiao, Wuhan (CN); Jun Yang, Wuhan (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 302 days.

(21) Appl. No.: 13/826,563

(22) Filed: Mar. 14, 2013

(65) Prior Publication Data

US 2013/0279713 A1    Oct. 24, 2013

(30) Foreign Application Priority Data

Apr. 18, 2012  (CN) .......................... 2012 1 0114116

(51) Int. Cl.
*H04R 3/00* (2006.01)
*H04M 1/02* (2006.01)
*H04M 1/60* (2006.01)

(52) U.S. Cl.
CPC .............. *H04R 3/00* (2013.01); *H04M 1/0274* (2013.01); *H04M 1/6058* (2013.01)

(58) Field of Classification Search
CPC .... H04R 1/1041; H04R 5/04; H04R 2420/05; H04R 3/00; H04R 29/00; H04R 29/004; H04R 5/033; H04M 1/6058; H04M 1/0274; H01R 13/66; H01R 24/58; H01R 2107/00
USPC .............................................. 381/58, 74, 123
See application file for complete search history.

(56) References Cited

U.S. PATENT DOCUMENTS

| 8,150,046 | B2* | 4/2012 | Hansson et al. ................. 381/58 |
| 8,718,296 | B2* | 5/2014 | Chang .............................. 381/74 |
| 8,861,743 | B2* | 10/2014 | Pantfoerder et al. ............ 381/74 |
| 2012/0051562 | A1* | 3/2012 | Kim ............................... 381/122 |
| 2012/0237051 | A1* | 9/2012 | Lee ................................. 381/74 |
| 2013/0129109 | A1* | 5/2013 | Jung ............................... 381/74 |
| 2013/0142350 | A1* | 6/2013 | Larsen et al. ................... 381/74 |
| 2013/0156216 | A1* | 6/2013 | Shah et al. ...................... 381/74 |

FOREIGN PATENT DOCUMENTS

| CN | 102143262 A | 8/2011 |
| CN | 102164263 A | 8/2011 |
| CN | 102300003 A | 12/2011 |
| EP | 2317743 A1 | 5/2011 |
| EP | 2317774 A2 | 5/2011 |
| EP | 2511992 A1 | 10/2012 |
| WO | WO 2011/079720 A1 | 7/2011 |

* cited by examiner

*Primary Examiner* — Vivian Chin
*Assistant Examiner* — Jason R Kurr
(74) *Attorney, Agent, or Firm* — Brinks Gilson & Lione

(57) ABSTRACT

A method and an electronic device for determining headset line sequence are disclosed in this application, where a third pin and a fourth pin on a headset plug are connected to a direct-current power supply to form a power supply branch, and a bias resistor is connected onto the power supply branch in series. This application obtains a second voltage between the third pin and the fourth pin, compares the second voltage with a preset first threshold, and according to a comparison result, determines a signal type of a signal transmitted by the third pin and a signal type of a signal transmitted by the fourth pin.

18 Claims, 8 Drawing Sheets

US 9,161,124 B2

METHOD AND ELECTRONIC DEVICE FOR DETERMINING HEADSET LINE SEQUENCE

CROSS-REFERENCE TO RELATED APPLICATION

This application claims priority to Chinese Patent Application No. 201210114116.9, filed on Apr. 18, 2012, which is hereby incorporated by reference in its entirety.

FIELD OF THE INVENTION

This application relates to the field of headset line sequence technologies, and in particular, to a method and an electronic device for determining headset line sequence.

BACKGROUND OF THE INVENTION

With the development of scientific technology, a headset as an auxiliary product of a terminal is applied wider and wider. Currently, the headset not only has an audio play function, but also can record sound through an electronic device.

At present, four signals exist in a headset used in a terminal: a left sound channel (L), a right sound channel (R), a ground (G) and a microphone MIC (M), and the four signals all communicate with the terminal through a headset plug. In order to make the headset match with different terminals, line sequence of the four signals in a headset head is generally fixed, so the electronic device only needs to perform line layout according to the fixed line sequence.

However, manufacturers that produce headsets are numerous, which divides the line sequence of most headsets in the market into two categories: the first line sequence LRGM shown in FIG. 1 and the second line sequence LRMG shown in FIG. 2. According to FIG. 1 and FIG. 2, it can be seen that, positions of MIC signals and ground signals in headsets of different manufacturers are different. No uniform standard exists, so either a headset with line sequence of LRGM or a headset with line sequence of LRMG can only be used in a terminal matching with line sequence of the headset. However, for a common user, the user cannot learn the line sequence arrangement of a headset, so that the user is unable to use the headset normally through a terminal.

SUMMARY OF THE INVENTION

A method for determining headset line sequence is provided, where a headset includes a headset plug and a headset line, one end of the headset plug is connected to the headset line of the headset, the headset plug is disposed with a first pin, a second pin, a third pin and a fourth pin sequentially from the other end of the headset plug to the one end connected to the headset line, a signal type of a signal transmitted by the first pin is a left sound channel signal, a signal type of a signal transmitted by the second pin is a right sound channel signal, the third pin and the fourth pin are connected to a direct-current power supply to form a power supply branch, a bias resistor is connected onto the power supply branch in series, and a voltage of the direct-current power supply is a first voltage, and the method includes:

obtaining a second voltage between the third pin and the fourth pin, where the second voltage is a voltage obtained after dividing the first voltage;

comparing the obtained second voltage with a preset first threshold, and generating a comparison result; and according to the comparison result, determining a signal type of a signal transmitted by the third pin and a signal type of a signal transmitted by the fourth pin.

An electronic device for determining headset line sequence is provided, where the electronic device is connected to a headset, the headset includes a headset plug and a headset line, one end of the headset plug is connected to the headset line of the headset, the headset plug is disposed with a first pin, a second pin, a third pin and a fourth pin sequentially from the other end of the headset plug to the one end connected to the headset line, a signal type of a signal transmitted by the first pin is a left sound channel signal, a signal type of a signal transmitted by the second pin is a right sound channel signal, the third pin and the fourth pin are connected to a direct-current power supply to form a power supply branch, a voltage of the direct-current power supply is a first voltage, and the electronic device includes: a bias resistor, a voltage measurement unit, a voltage comparison unit, and a line sequence determining unit, where the bias resistor is connected onto the power supply branch in series;

the voltage measurement unit is connected between the third pin and the fourth pin, and is configured to obtain a second voltage between the third pin and the fourth pin, where the second voltage is a voltage obtained after dividing the first voltage;

the voltage comparison unit is connected to the voltage measurement unit, and is configured to compare the obtained second voltage with a preset first threshold, and generate a comparison result; and the line sequence determining unit is connected to the voltage comparison unit, and is configured to, according to the comparison result, determine a signal type of a signal transmitted by the third pin and a signal type of a signal transmitted by the fourth pin.

DETAILED DESCRIPTION OF THE EMBODIMENTS

To make the technical solutions of this application more comprehensible for persons skilled in the art, the following clearly describes the technical solutions in the embodiments of this application with reference to the accompanying drawings in the embodiments of this application. Apparently, the embodiments to be described are merely a part rather than all of the embodiments of this application. All other embodiments obtained by persons of ordinary skill in the art based on the embodiments of this application without creative efforts shall fall within the protection scope of this application.

Figure 1:
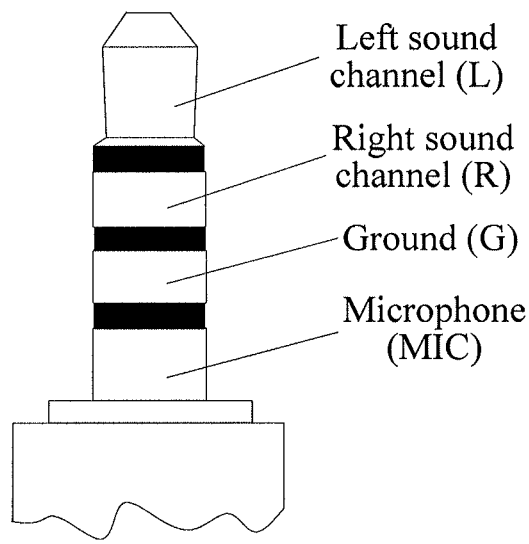
FIG. 1 is a schematic diagram of pins of a headset with line sequence of LRGM.
Figure 2:
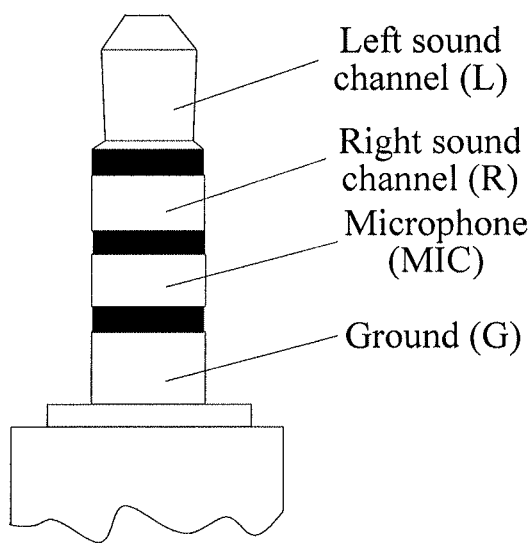
FIG. 2 is a schematic diagram of pins of a headset with line sequence of LRMG.
Figure 3:
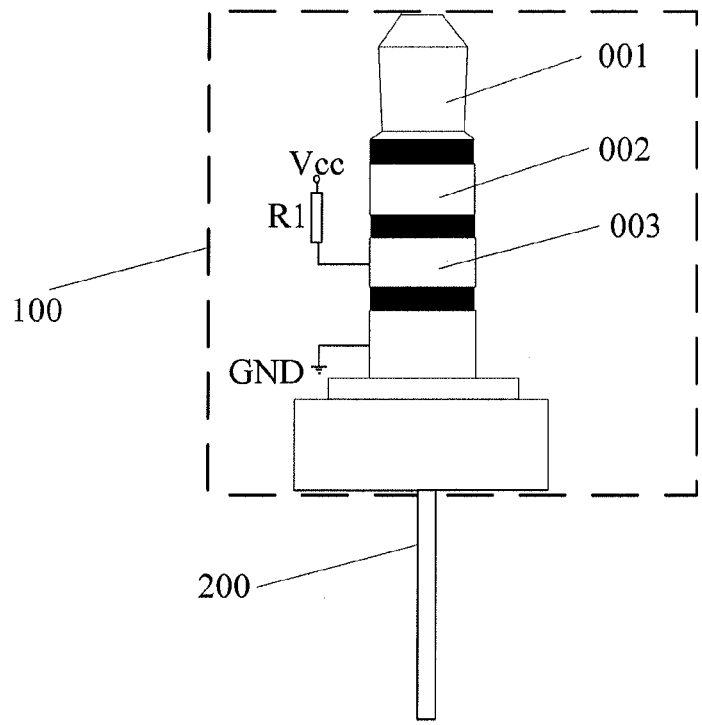
FIG. 3 is a schematic diagram of implementation of a method for determining headset line sequence provided by an embodiment of this application.
Figure 4:
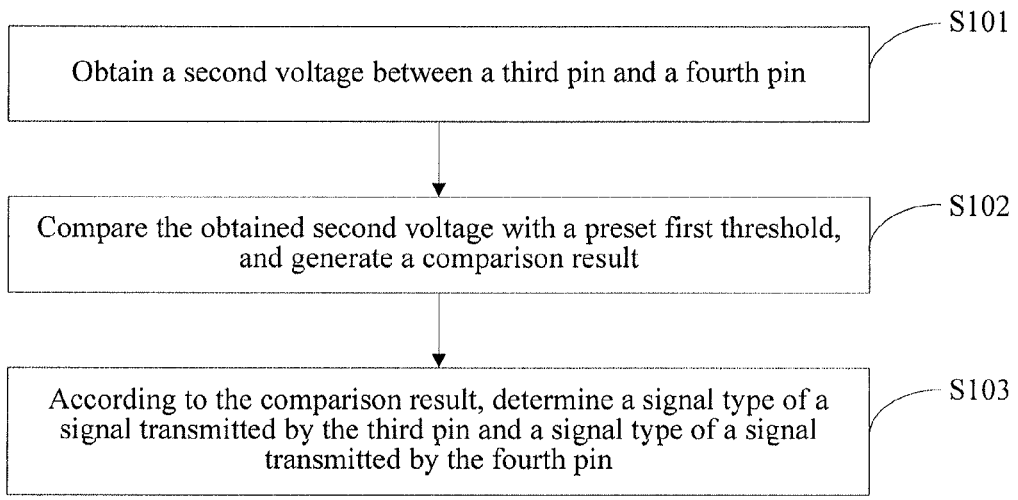
FIG. 4 is a schematic flow chart of a method for determining headset line sequence provided by an embodiment of this application.

As shown in FIG. 3, in a method for determining headset line sequence provided by the an embodiment of this application, a headset includes a headset plug 100 and a headset line 200, where one end of the headset plug 100 is connected to the headset line 200 of the headset, the other end of the headset plug 100 is a tail end of the headset plug 100, the headset plug 100 is disposed with a first pin 001, a second pin 002, a third pin 003 and a fourth pin 004 sequentially from the tail end to one end connected to the headset line 200, a signal type of a signal transmitted by the first pin 001 is a left sound channel signal, a signal type of a signal transmitted by the second pin 002 is a right sound channel signal; and the third pin 003 and the fourth pin 004 are connected to a direct-current power supply Vcc to form a power supply branch, a bias resistor R1 is connected onto the power supply branch in series, and a voltage of the direct-current power supply $V_{cc}$ is a first voltage V1. As shown in FIG. 4, the method may include the following steps:

S101: Obtain a second voltage V2 between the third pin 003 and the fourth pin 004, where the second voltage V2 is a voltage obtained after dividing the first voltage V1.

Persons of skill in the art should understand that, the headset plug 100 is generally formed by a columnar pin and a base, where the columnar pin is disposed on the base and connected to the headset line 200 through the base. The base is one end of a headset socket 100 connected to the headset line 200, and an opposite side of a side of the columnar pin contacting the base is the tail end of the headset socket 100.

The bias resistor R1 is connected to the third pin 003 or the fourth pin 004, and through the bias resistor R1, the first voltage V1 is applied to the third pin 003 and the fourth pin 004.

The first voltage V1 may be greater than 2.6 V.

It should be noted that, lines in headsets with two different kinds of line sequence LRGM and LRMG are different.

Figure 5:
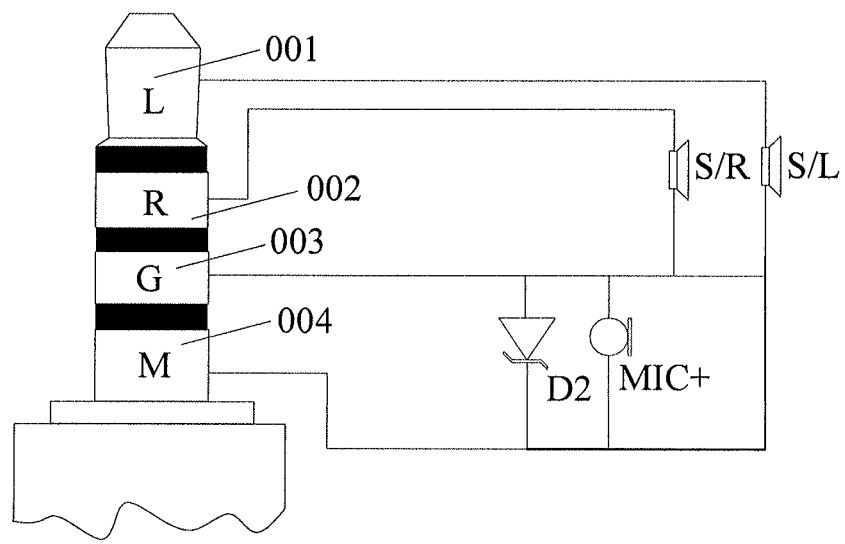
FIG. 5 is a schematic diagram of connection of elements in a headset with line sequence of LRGM to headset pins.

FIG. 5 shows a line connection condition of headset lines in a headset with line sequence of LRGM. As shown in FIG. 5, a signal type of a signal transmitted by the first pin 001 is a left sound channel signal (L), a signal type of a signal transmitted by the second pin 002 is a right sound channel signal (R), a signal type of a signal transmitted by the third pin 003 is a ground signal (G), and a signal type of a signal transmitted by the fourth pin 004 is a microphone MIC signal (M). For convenience, L is used to name the first pin 001, R is used to name the second pin 002, G is used to name the third pin 003, and M is used to name the fourth pin 004. It can be seen from FIG. 5 that, a loudspeaker S/L is connected between L and G, the left sound channel signal (L) may drive the loudspeaker S/L to output sound, a loudspeaker S/R is connected between R and G, and the right sound channel signal (R) may drive the loudspeaker S/R to output sound. A microphone circuit is connected between G and M, and MIC+ may record sound, and through the fourth pin 004, output a sound signal to a terminal connected to the headset. A diode D2 plays a freewheeling role. As shown in FIG. 5, in the headset with line sequence of LRGM, the orientation of the diode D2 between G and M is as follows: The positive terminal of the diode D2 is connected to the third pin 003 and the negative terminal of the diode D2 is connected to the fourth pin 004.

Figure 6:
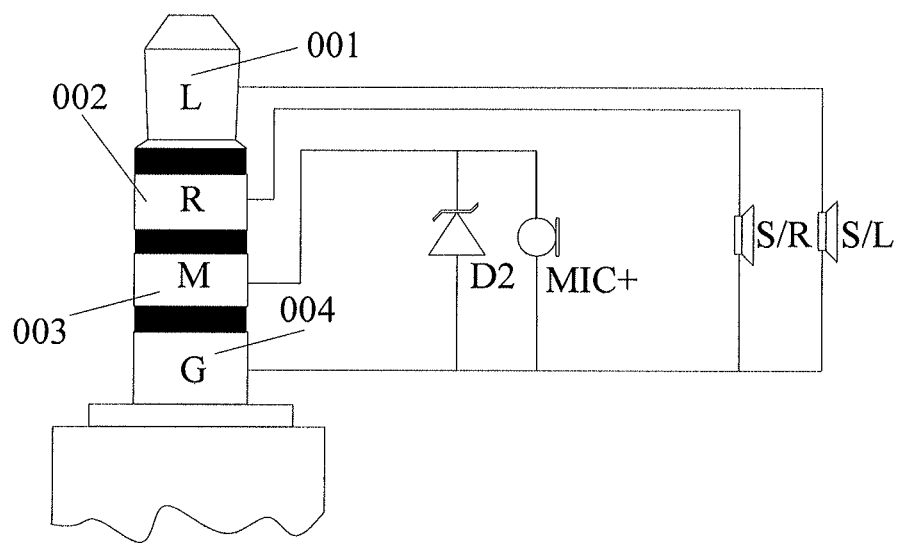
FIG. 6 is a schematic diagram of connection of elements in a headset with line sequence of LRMG to headset pins.

FIG. 6 shows a line connection condition of a pin of a headset plug and a signal line in a headset line in a headset with line sequence LRMG. As shown in FIG. 6, a signal type of a signal transmitted by the first pin 001 is a left sound channel signal (L), a signal type of a signal transmitted by the second pin 002 is a right sound channel signal (R), a signal type of a signal transmitted by the third pin 003 is a microphone MIC signal (M), and a signal type of a signal transmitted by the fourth pin 004 is a ground signal (G). For convenience, L is used to name the first pin 001, R is used to name the second pin 002, M is used to name the third pin 003, and G is used to name the fourth pin 004. It can be seen from FIG. 6 that, a loudspeaker S/L is connected between L and G, the left sound channel signal (L) may drive the loudspeaker SIL to output sound, a loudspeaker S/R is connected between R and G, and the right sound channel signal (R) may drive the loudspeaker S/R to output sound. A microphone circuit is connected between G and M, and MIC+ may record sound and through the third pin 003, output a sound signal to a terminal connected to the headset. A diode D2 plays a freewheeling role. As shown in FIG. 6, in the headset with line sequence of LRMG, the orientation of the diode D2 between G and M is as follows: The negative terminal of the diode D2 is connected to the third pin 003 and the positive terminal of the diode D2 is connected to the fourth pin 004.

Figure 7:
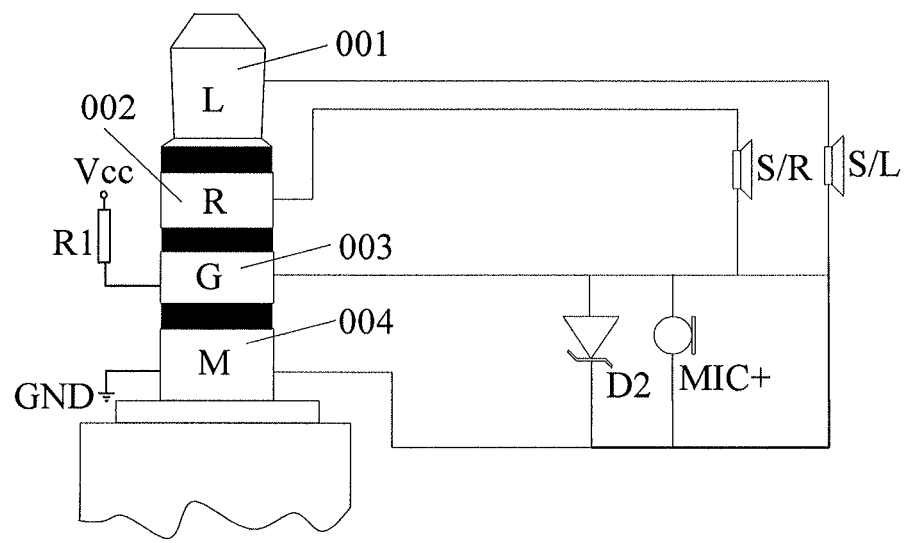
FIG. 7 is a schematic circuit diagram of implementing a method for determining headset line sequence on a headset with line sequence of LRGM provided by an embodiment of this application.
Figure 8:
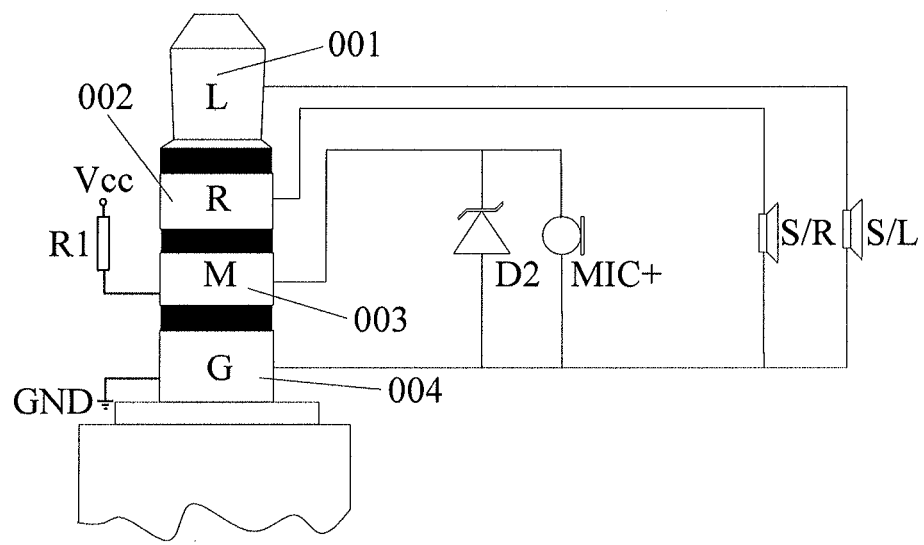
FIG. 8 is a schematic circuit diagram of implementing a method for determining headset line sequence on a headset with line sequence of LRMG provided by an embodiment of this application.

It should be understood that, the third pin 003 and the fourth pin 004 are connected to a direct-current power supply Vcc to form a power supply branch, a bias resistor R1 is connected onto the power supply branch in series, and a voltage of the direct-current power supply $V_{cc}$ is a first voltage V1, which may specifically include the following:

As shown in FIG. 7 and FIG. 8, when the third pin 003 is connected to one end of the bias resistor R1, the other end of the bias resistor R1 is connected to the direct-current power supply $V_{cc}$, the voltage of the direct-current power supply $V_{cc}$ is the first voltage V1, and the fourth pin 004 is grounded GND.

Figure 9:
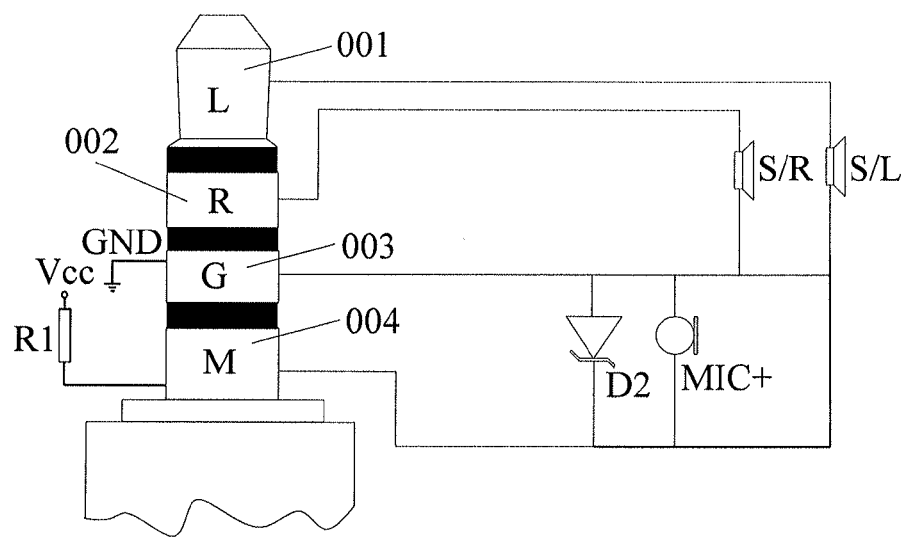
FIG. 9 is another schematic circuit diagram of implementing a method for determining headset line sequence on a headset with line sequence of LRGM provided by an embodiment of this application.
Figure 10:
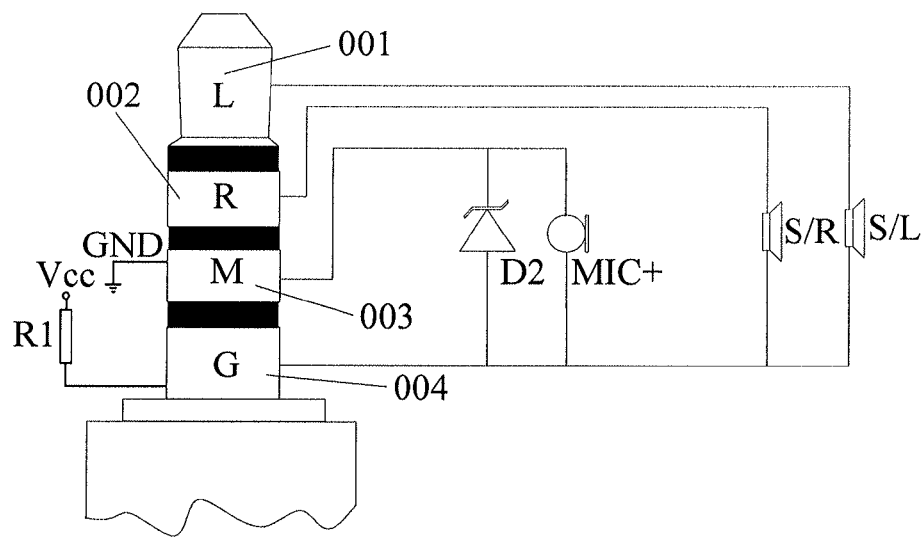
FIG. 10 is another schematic circuit diagram of implementing a method for determining headset line sequence on a headset with line sequence of LRMG provided by an embodiment of this application.

As shown in FIG. 9 and FIG. 10, when the fourth pin 004 is connected to one end of the bias resistor R1, the other end of the bias resistor R1 is connected to the direct-current power supply $V_{cc}$, the voltage of the direct-current power supply $V_{cc}$ is the first voltage V1, and the third pin 003 is grounded GND.

As shown in FIG. 7, in the headset with line sequence of LRGM, when the third pin 003 is connected to one end of the bias resistor R1, because of the orientation of the diode D2, the diode D2 is conducted, the microphone MIC+ is short-circuited, and the second voltage V2 between the third pin 003 and the fourth pin 004 is low.

As shown in FIG. 8, in the headset with line sequence of LRMG, when the third pin 003 is connected to one end of the bias resistor R1, because of the orientation of the diode D2, the diode D2 is not conducted, and the second voltage V2 between the third pin 003 and the fourth pin 004 is high and is a voltage obtained after the microphone MIC+ divides the first voltage V1.

As shown in FIG. 9, in the headset with line sequence of LRGM, when the fourth pin 004 is connected to one end of the bias resistor R1, because of the orientation of the diode D2, the diode D2 is not conducted, and the second voltage V2 between the third pin 003 and the fourth pin 004 is high and is a voltage obtained after the microphone MIC+ divides the first voltage V1.

As shown in FIG. 10, in the headset with line sequence of LRMG, when the fourth pin 004 is connected to one end of the bias resistor R1, because of the orientation of the diode D2, the diode D2 is conducted, the microphone MIC+ is short-circuited, and the second voltage V2 between the third pin 003 and the fourth pin 004 is low.

S102: Compare the obtained second voltage V2 with a preset first threshold, and generate a comparison result.

Because there is the difference between the value of the second voltage V2 between the third pin 003 and the fourth pin 004 in a headset with line sequence of LRGM and the value of the second voltage V2 between the third pin 003 and the fourth pin 004 in a headset with line sequence LRMG, so the line sequence of a headset can be determined by detecting the second voltage V2 between the third pin 003 and the fourth pin 004.

Specifically, step S102 may specifically include:

comparing the obtained second voltage V2 with the preset first threshold, when the second voltage V2 is greater than the first threshold, generating a first comparison result; when the second voltage V2 is not greater than the first threshold, generating a second comparison result.

When the third pin 003 is connected to one end of the bias resistor R1, the first comparison result is: determining that the signal type of the signal transmitted by the third pin 003 is a microphone signal M, and determining that the signal type of the signal transmitted by the fourth pin 004 is a ground signal G; and the second comparison result is: determining that the signal type of the signal transmitted by the third pin 003 is a ground signal G, and determining that the signal type of the signal transmitted by the fourth pin 004 is a microphone signal M.

When the fourth pin 004 is connected to one end of the bias resistor R1, the first comparison result is: determining that the signal type of the signal transmitted by the third pin 003 is a ground signal G, and determining that the signal type of the signal transmitted by the fourth pin 004 is a microphone signal M; and the second comparison result is: determining that the signal type of the signal transmitted by the third pin 003 is a microphone signal M, and determining that the signal type of the signal transmitted by the fourth pin 004 is a ground signal G.

When the first voltage $V_{cc}$ may be 2.6 V, the first threshold may be 1.2 V.

S103: According to the comparison result, determine the signal type of the signal transmitted by the third pin 003 and the signal type of the signal transmitted by the fourth pin 004.

The analysis process of the case that the third pin 003 is connected to the bias resistor R1 and the analysis process of the case that the fourth pin 004 is connected to the bias resistor R1 are similar, so this application only takes the case that "the third pin 003 is connected to the bias resistor R1" as an example for illustration.

When it is detected that the obtained second voltage between the third pin 003 and the fourth pin 004 is not greater than the first threshold, it may be determined that the headset line sequence is LRGM shown in FIG. 5; and when it is detected that the obtained second voltage is greater than the first threshold, it may be determined that the headset line sequence is LRMG shown in FIG. 7.

When the first voltage $V_{cc}$ is 2.6 V and the first threshold is 1.2 V, the method of this application is used to measure headset line sequence of four manufacturers shown in Table 1, to obtain results shown in Table 1.

TABLE 1

| Headset Manufacturer | Detected Voltage | Line sequence |
| --- | --- | --- |
| NOKIA | 1.757 V | LRMG |
| IPhone | 0.496 V | LRGM |
| HTC | 0.621 V | LRGM |
| HUAWEI | 1.394 V | LRMG |

A method for determining headset line sequence provided by an embodiment of this application may be applied to a handheld terminal, the handheld terminal determines the headset line sequence, and provides the determined headset line sequence for a user through voice or a displayed message or a signal light, so as to prompt the user to select a suitable headset or a headset matching device to match the headset with the headset matching device. Of course, the method for determining headset line sequence provided by the embodiment of this application may also be applied to a headset matching device. The headset matching device is a device that may use a headset to perform audio output and/or audio input, and the headset matching device may be a mobile phone, a computer, a tablet computer, a multimedia play device, or the like, which is not limited in this application.

The method for determining headset line sequence provided by the embodiment of this application can, according to electrical connection conditions of headsets with different line sequence, apply a voltage between third pin and fourth pin in a headset, then detect a voltage drop between the third pin and the fourth pin, and compare the voltage drop with a preset threshold, so as to determine headset line sequence according to different comparison results. After the headset line sequence is determined, the determined headset line sequence is provided for the user through voice or a message, so as to give the user a prompt whether a currently used headset matches with the handheld terminal, so that it is convenient for the user to select a terminal matching with the headset line sequence to use the headset, thereby improving feeling of the user.

Figure 11:
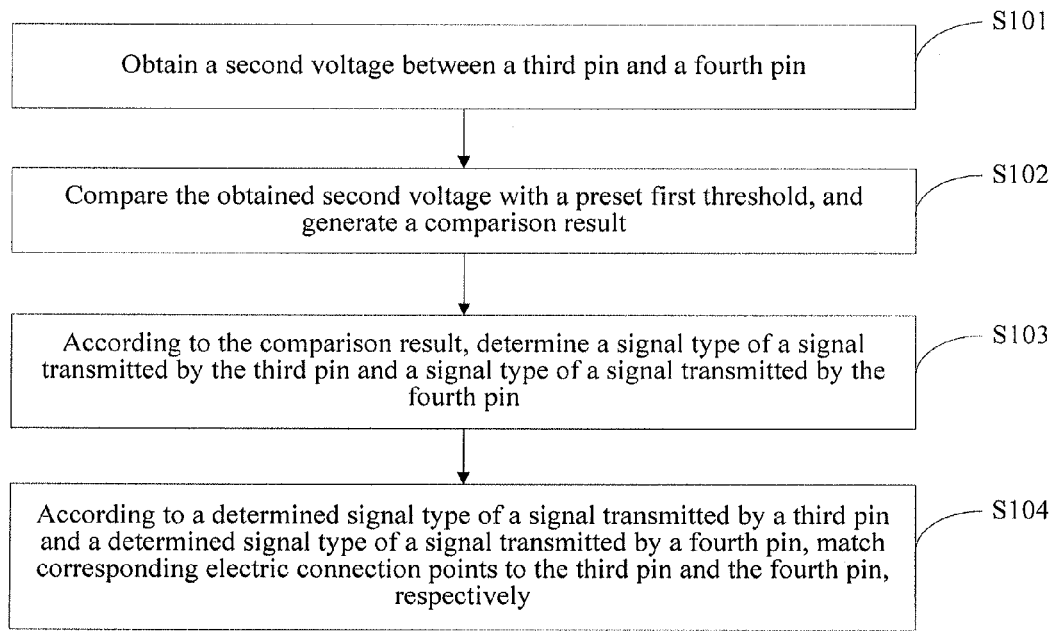
FIG. 11 is a schematic flow chart of another method for determining headset line sequence provided by an embodiment of this application.

As shown in FIG. 11, another method for determining headset line sequence provided by an embodiment of this application may further include the following steps.

S104: According to a determined signal type of a signal transmitted by a third pin 003 and a determined signal type of a signal transmitted by a fourth pin 004, match corresponding electrical connection points to the third pin 003 and the fourth pin 004, respectively.

In this embodiment, the third pin 003 may be connected to an electrical connection point that is in a headset matching device and matches with the signal type of the signal transmitted by the third pin 003, where the headset matching device is a device using a headset to perform audio output and/or audio input; and the fourth pin 004 is connected to an electrical connection point that is in the headset matching device and matches with the signal type of the signal transmitted by the fourth pin 004.

The method for determining headset line sequence provided by the embodiment shown in FIG. 11 may be applied to the headset matching device.

Specifically, connecting the third pin 003 to the electrical connection point that is in the headset matching device and matches with the signal type of the signal transmitted by the third pin 003 may include:

when the signal type of the signal transmitted by the third pin 003 is a microphone signal M, connecting the third pin 003 to a microphone signal input point in the headset matching device;

when the signal type of the signal transmitted by the third pin 003 is a ground signal G, connecting the third pin 003 to a ground signal connection point in the headset matching device.

Specifically, connecting the fourth pin 004 to the electrical connection point that is in the headset matching device and matches with the signal type of the signal transmitted by the fourth pin 004 may include:

when the signal type of the signal transmitted by the fourth pin 004 is a microphone signal M, connecting the fourth pin 004 to the microphone signal input point in the headset matching device; and when the signal type of the signal transmitted by the fourth pin 004 is a ground signal G, connecting the fourth pin 004 to the ground signal connection point in the headset matching device.

The microphone signal input point in a terminal may be a microphone signal input pin of a processor in the terminal, and the ground signal connection point in the terminal may be a ground signal pin of the processor in the terminal. Of course, persons of skill in the art should understand that, other electrical points that are in the terminal connected to the headset and use the microphone signal may be connected to the pin corresponding to the determined microphone signal of the headset, which is not limited in this application.

In the method for determining headset line sequence provided by this embodiment, after a user inserts a headset into a terminal, the headset line sequence may be automatically determined and according to the determined headset line sequence, a corresponding electrical connection point may be matched to a pin of the headset, so the user does not need to replace the headset or the terminal because the headset line sequence does not match with the terminal, so that the user uses the headset and the terminal more conveniently, thereby improving feeling of the user.

Figure 12:
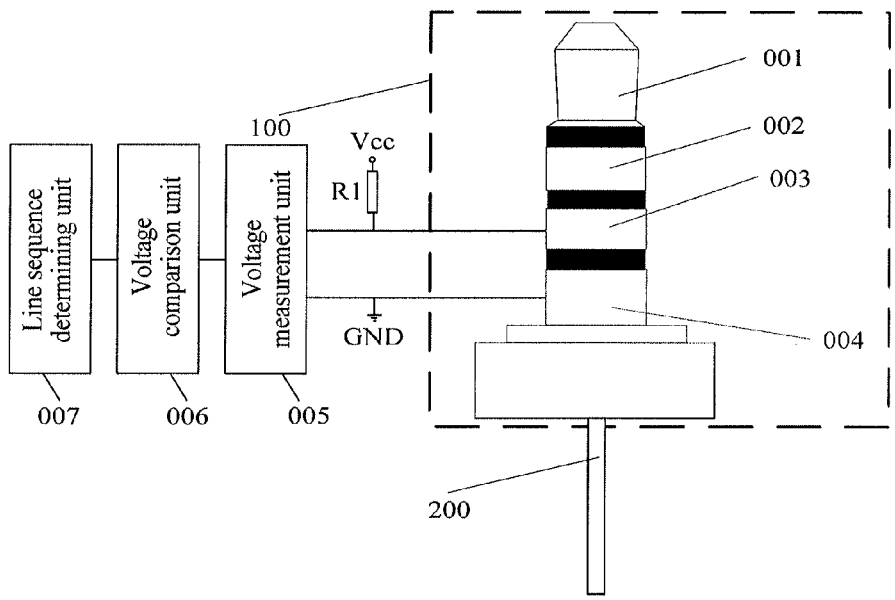
FIG. 12 is a schematic structural diagram of an electronic device for determining headset line sequence provided by an embodiment of this application.

Corresponding to the foregoing method embodiments, this application further provides an electronic device for determining headset line sequence, which may be connected to a headset. As shown in FIG. 12, the headset includes a headset plug 100 and a headset line 200, where one end of the headset plug 100 is connected to the headset line 200 of the headset, the other end of the headset plug 100 is a tail end of the headset plug 100, the headset plug 100 is disposed with a first pin 001, a second pin 002, a third pin 003 and a fourth pin 004 sequentially from the tail end to the one end connected to the headset line 200, a signal type of a signal transmitted by the first pin 001 is a left sound channel signal, a signal type of a signal transmitted by the second pin 002 is a right sound channel signal; the third pin 003 and the fourth pin 004 are connected to a direct-current power supply Vcc to form a power supply branch, and a voltage of the direct-current power supply $V_{cc}$ is a first voltage V1. As shown in FIG. 12, the electronic device may include: a bias resistor R1, a voltage measurement unit 005, a voltage comparison unit 006, and a line sequence determining unit 007, where the bias resistor R1 is connected onto the power supply branch in series; and the voltage measurement unit 005 is connected between the third pin 003 and the fourth pin 004, and is configured to obtain a second voltage V2 between the third pin 003 and the fourth pin 004, where the second voltage V2 is a voltage obtained after dividing the first voltage V1.

Specifically, the voltage measurement unit 005 may be a voltmeter, a multimeter, a circuit unit having a function of voltage measurement, or the like.

Persons of skill in the art should understand that, the headset plug 100 is generally formed by a columnar pin and a base, where the columnar pin is disposed on the base and connected to the headset line 200 through the base. The base is one end of the headset socket 100 connected to the headset line 200, and an opposite side of a side of the columnar pin contacting the base is the tail end of the headset socket 100.

The bias resistor R1 is connected to the third pin 003 or the fourth pin 004, and through the bias resistor R1, the first voltage V1 is applied to the third pin 003 and the fourth pin 004.

The first voltage V1 may be greater than 2.6 V.

FIG. 5 shows a line connection condition of headset lines in a headset with line sequence of LRGM. As shown in FIG. 5, a signal type of a signal transmitted by the first pin 001 is a left sound channel signal (L), a signal type of a signal transmitted by the second pin 002 is a right sound channel signal (R), a signal type of a signal transmitted by the third pin 003 is a ground signal (G), and a signal type of a signal transmitted by the fourth pin 004 is a microphone MIC signal (M). For convenience, L is used to name the first pin 001, R is used to name the second pin 002, G is used to name the third pin 003, and M is used to name the fourth pin 004. It can be seen from FIG. 5 that, a loudspeaker S/L is connected between L and G, the left sound channel signal (L) may drive the loudspeaker S/L to output sound, a loudspeaker S/R is connected between R and G, and the right sound channel signal (R) may drive the loudspeaker S/R to output sound. A microphone circuit is connected between G and M, and MIC+ may record sound, and through the fourth pin 004, output a sound signal to a terminal connected to the headset. A diode D2 plays a freewheeling role. As shown in FIG. 5, in the headset with line sequence of LRGM, the orientation of the diode D2 between G and M is as follows: The positive terminal of the diode D2 is connected to the third pin 003 and the negative terminal of the diode D2 is connected to the fourth pin 004.

FIG. 6 shows a line connection condition of a pin of a headset plug and a signal line in a headset line in a headset with line sequence LRMG. As shown in FIG. 6, a signal type of a signal transmitted by the first pin 001 is a left sound channel signal (L), a signal type of a signal transmitted by the second pin 002 is a right sound channel signal (R), a signal type of a signal transmitted by the third pin 003 is a microphone MIC signal (M), and a signal type of a signal transmitted by the fourth pin 004 is a ground signal (G). For convenience, L is used to name the first pin 001, R is used to name the second pin 002, M is used to name the third pin 003, and G is used to name the fourth pin 004. It can be seen from FIG. 6 that, a loudspeaker S/L is connected between L and G, the left sound channel signal (L) may drive the loudspeaker S/L to output sound, a loudspeaker S/R is connected between R and G, and the right sound channel signal (R) may drive the loudspeaker S/R to output sound. A microphone circuit is connected between G and M, and MIC+ may record sound and through the third pin 003, output a sound signal to a terminal connected to the headset. A diode D2 plays a freewheeling role. As shown in FIG. 6, in the headset with line sequence of LRMG, the orientation of the diode D2 between G and M is as follows: The negative terminal of the diode D2 is connected to the third pin 003 and the positive terminal of the diode D2 is connected to the fourth pin 004.

It should be understood that, the third pin 003 and the fourth pin 004 are connected to a direct-current power supply Vcc to form a power supply branch, a bias resistor R1 is connected onto the power supply branch in series, and a voltage of the direct-current power supply $V_{cc}$ is a first voltage V1, which may specifically include the following:

As shown in FIG. 7 and FIG. 8, when the third pin 003 is connected to one end of the bias resistor R1, the other end of the bias resistor R1 is connected to the direct-current power supply $V_{cc}$, the voltage of the direct-current power supply $V_{cc}$ is the first voltage V1, and the fourth pin 004 is grounded GND.

As shown in FIG. 9 and FIG. 10, when the fourth pin 004 is connected to one end of the bias resistor R1, the other end of the bias resistor R1 is connected to the direct-current power supply $V_{cc}$, the voltage of the direct-current power supply $V_{cc}$ is the first voltage V1, and the third pin 003 is grounded GND.

As shown in FIG. 7, in the headset with line sequence of LRGM, when the third pin 003 is connected to one end of the bias resistor R1, because of the orientation of the diode D2, the diode D2 is conducted, the microphone MIC+ is short-circuited, and the second voltage V2 between the third pin 003 and the fourth pin 004 is low.

As shown in FIG. 8, in the headset with line sequence of LRMG, when the third pin 003 is connected to one end of the bias resistor R1, because of the orientation of the diode D2, the diode D2 is not conducted, and the second voltage V2 between the third pin 003 and the fourth pin 004 is high and is a voltage obtained after the microphone MIC+ divides the first voltage V1.

As shown in FIG. 9, in the headset with line sequence of LRGM, when the fourth pin 004 is connected to one end of the bias resistor R1, because of the orientation of the diode D2, the diode D2 is not conducted, and the second voltage V2 between the third pin 003 and the fourth pin 004 is high and is a voltage obtained after the microphone MIC+ divides the first voltage V1.

As shown in FIG. 10, in the headset with line sequence of LRMG, when the fourth pin 004 is connected to one end of the bias resistor R1, because of the orientation of the diode D2, the diode D2 is conducted, the microphone MIC+ is short-circuited, and the second voltage V2 between the third pin 003 and the fourth pin 004 is low.

The voltage comparison unit 006 is connected to the voltage measurement unit 005 and is configured to compare the obtained second voltage V2 with a preset first threshold and generate a comparison result.

Because there is the difference between the value of the second voltage V2 between the third pin 003 and the fourth pin 004 in a headset with line sequence of LRGM and the value of the second voltage V2 between the third pin 003 and the fourth pin 004 in a headset with line sequence LRMG, so the line sequence of a headset can be determined by detecting the second voltage V2 between the third pin 003 and the fourth pin 004.

The voltage comparison module may be specifically configured to:

compare the obtained second voltage V2 with the preset first threshold, when the second voltage V2 is greater than the first threshold, generate a first comparison result; when the second voltage V2 is not greater than the first threshold, generate a second comparison result.

When the third pin 003 is connected to one end of the bias resistor R1, the first comparison result is: determining that the signal type of the signal transmitted by the third pin 003 is a microphone signal M, and determining that the signal type of the signal transmitted by the fourth pin 004 is a ground signal G; and the second comparison result is: determining that the signal type of the signal transmitted by the third pin 003 is a ground signal G, and determining that the signal type of the signal transmitted by the fourth pin 004 is a microphone signal M.

When the fourth pin 004 is connected to one end of the bias resistor R1, the first comparison result is: determining that the signal type of the signal transmitted by the third pin 003 is a ground signal G, and determining that the signal type of the signal transmitted by the fourth pin 004 is a microphone signal M; and the second comparison result is: determining that the signal type of the signal transmitted by the third pin 003 is a microphone signal M, and determining that the signal type of the signal transmitted by the fourth pin 004 is a ground signal G.

When the first voltage $V_{cc}$ may be 2.6 V, the first threshold may be 1.2 V.

The line sequence determining unit 007 is connected to the voltage comparison unit 006 and is configured to determine, according to the comparison result, a signal type of a signal transmitted by the third pin 003 and a signal type of a signal transmitted by the fourth pin 004.

The line sequence determining unit 007 may be a processor and the voltage comparison unit 006 may be an element such as a comparator. Specifically, when the voltage comparison unit 006 is a comparator, it may compare the second voltage with the preset first threshold to generate a comparison result. There are only two signal types of the signals transmitted by the third pin 003 and there are only two signal types of the signals transmitted by the fourth pin 004, so the line sequence determining unit 007 only needs to contrast the comparison result with the two cases, and the signal type of the signal transmitted by the third pin 003 and the signal type of the signal transmitted by the fourth pin 004 can be determined. Preferably, the line sequence determining unit 007 may output the determined signal type of the signal transmitted by the third pin 003 and the determined signal type of the signal transmitted by the fourth pin 004 to an output device (such as a screen, an indicator light and a loudspeaker). In this way, a user can learn the headset line sequence from voice or a signal light or a displayed message in the output device.

The electronic device for determining headset line sequence provided by the embodiment of this application may be a handheld terminal, the handheld terminal determines the headset line sequence, and provides the determined headset line sequence for a user through voice or a displayed message or a signal light, so as to give the user a prompt whether a currently used headset matches with the handheld terminal. A terminal provided by the embodiment of this application may also be a headset matching device. The headset matching device is a device that may use a headset to perform audio output and/or audio input, and the headset matching device may be a mobile phone, a computer, a tablet computer, a multimedia play device, or the like, which is not limited in this application.

Figure 13:
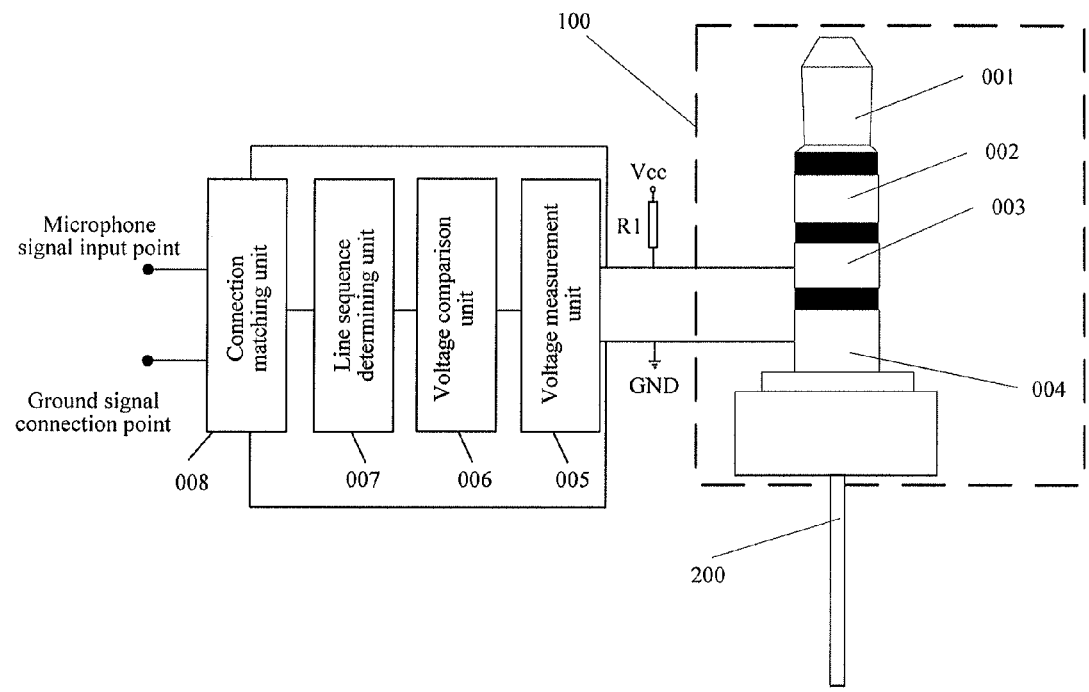
FIG. 13 is a schematic structural diagram of another electronic device for determining headset line sequence provided by an embodiment of this application.

The electronic device for determining headset line sequence provided by the embodiment of this application can, according to electrical connection conditions of headsets with different line sequence, apply a voltage between third pin and fourth pin in a headset, then detect a voltage drop between the third pin and the fourth pin, and compare the voltage drop with a preset threshold, so as to determine headset line sequence according to different comparison results. After the headset line sequence is determined, the determined headset line sequence is provided for the user through voice or a message, so as to give the user a prompt whether a currently used headset matches with the handheld terminal, so that it is convenient for the user to select a terminal matching with the headset line sequence to use the headset, thereby improving feeling of the user, As shown in FIG. 13, another electronic device for determining headset line sequence provided by an embodiment of this application may further include: a connection matching unit 008, connected to the line sequence determining unit 007 and configured to, according to the determined signal type of the signal transmitted by the third pin 003 and the determined signal type of the signal transmitted by the fourth pin 004, match corresponding electrical connection points to the third pin 003 and the fourth pin 004, respectively.

The connection matching unit 008 may include:

a third pin matching subunit and a fourth pin matching subunit.

The third pin matching subunit is configured to connect the third pin 003 to an electrical connection point that is in a headset matching device and matches with the signal type of the third pin 003, where the headset matching device is a device using a headset to perform audio output and/or audio input.

The third pin matching subunit may be specifically configured to:

when the signal type of the signal transmitted by the third pin 003 is a microphone signal, connect the third pin 003 to a microphone signal input point in the headset matching device; and when the signal type of the signal transmitted by the third pin is a ground signal, connect the third pin to a ground signal connection point in the headset matching device.

The fourth pin matching subunit is configured to connect the fourth pin 004 to an electrical connection point that is in the headset matching device and matches with the signal type of the fourth pin 004.

The fourth pin matching subunit may be specifically configured to:

when the signal type of the signal transmitted by the fourth pin 004 is a microphone signal, connect the fourth pin 004 to the microphone signal input point in the headset matching device; and when the signal type of the signal transmitted by the fourth pin 004 is a ground signal, connect the fourth pin 004 to the ground signal connection point in the headset matching device.

The microphone signal input point in the headset matching device may be a microphone signal input pin of a processor in the headset matching device, and the ground signal connection point of the headset matching device may be a ground signal pin of the processor in the headset matching device.

Figure 14:
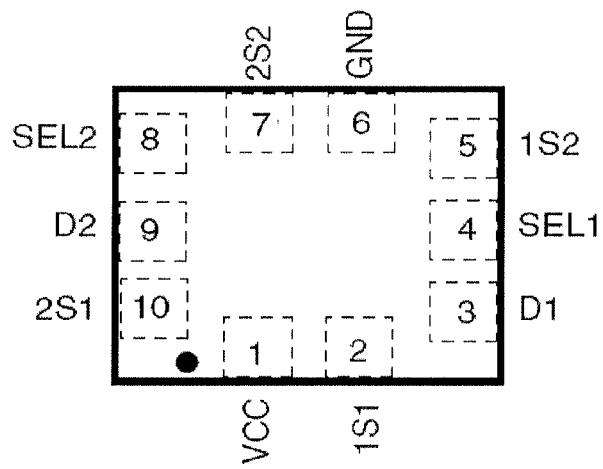
FIG. 14 is a diagram of pins of a chip STG5223 in an electronic device for determining headset line sequence provided by an embodiment of this application.
Figure 15:
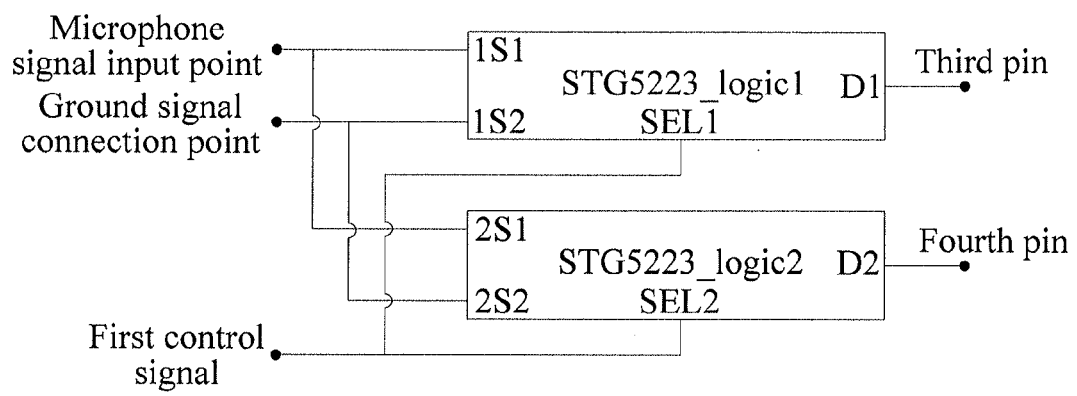
FIG. 15 is a schematic logic diagram of a chip STG5223 in an electronic device for determining headset line sequence provided by an embodiment of this application.

Specifically, the connection matching unit 008 may be a chip STG5223, and FIG. 14 is a diagram of pins of the chip. In this embodiment, the connection matching unit 008 may further be a chip of another model with the same function, which is not limited in this application. As shown in FIG. 15, the chip includes two logic circuits: a first logic circuit STG5223_logic1 and a second logic circuit STG5223_logic2, where A first input end 1S1 of STG5223_logic1 is connected to the microphone signal input point in a terminal, a second input end 1S2 of STG5223_logic1 is connected to the ground signal connection point in the terminal, an output end D1 of STG5223_logic1 is connected to the third pin 003, a control end SEL1 of STG5223_logic1 inputs a first control signal, when a first comparison result is generated, the first control signal is at a high level, and when a second comparison result is generated, the first control signal is at a low level; and a first input end 2S1 of the STG5223_logic2 is connected to the ground signal connection point in the terminal, a second input end 2S2 of the STG5223_logic2 is connected to the microphone signal input point in the terminal, an output end D2 of the STG5223_logic2 is connected to the fourth pin 004, and a control end SEL2 of the STG5223_logic2 inputs the first control signal.

The logic of the STG5223_logic1 is the same as that of the STG5223_logic2, so the following takes the STG5223_logic1 as an example to illustrate the chip STG5223.

Figure 16:
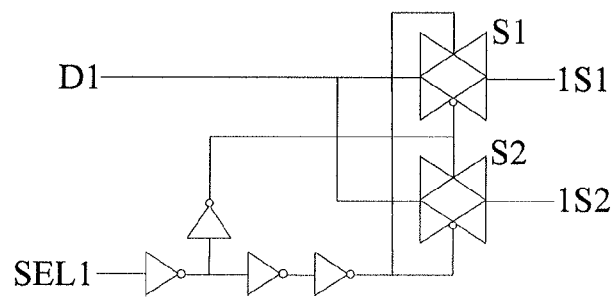
FIG. 16 is a schematic diagram of a first logic circuit of a chip STG5223 in an electronic device for determining headset line sequence provided by an embodiment of this application.

FIG. 16 is a principle diagram of STG5223_logic1.

A truth table of the STG 5223_logic1 is described in Table 2.

TABLE 2

| Control End SEL1 | Switch S1 | Switch S2 |
|---|---|---|
| H | ON | OFF |
| L | OFF | ON |

In combination with FIG. 16 and Table 2, when the control end SEL1 is at a high level, the switch S1 is turned on and the switch S2 is turned off, so the output end D1 and the first input end 1S1 form a path; and when the control end SEL1 is at a low level, the switch S2 is turned on and the switch S1 is turned off, so the output end D1 and the second input end 1S2 form a path.

Referring to FIG. 15, when the first control signal is at a high level, 1S1 in STG5223_logic1 and the third pin form a path, so that the third pin and the microphone signal input point form a path. When the first control signal is at a high level, 2S1 in STG5223_logic2 and the fourth pin form a path, so that the fourth pin and the ground signal connection point form a path. When the first control signal is at a low level, 1S2 in STG5223_logic1 and the third pin form a path, so that the third pin and the ground signal connection point form a path. When the first control signal is at a low level, 2S2 in STG5223_logic2 and the fourth pin form a path, so that the fourth pin and the microphone signal input point form a path. It can be seen that, according to that the level of the first control signal is high or low, the correspondence relation of the third pin and the fourth pin mapping the microphone signal input point and the ground signal connection point can be easily switched.

In the electronic device for determining headset line sequence provided by this embodiment, after a user inserts a headset into a terminal, the headset line sequence may be automatically determined and according to the determined headset line sequence, a corresponding electrical connection point may be matched to a pin of the headset, so the user does not need to replace the headset or the terminal because the headset line sequence does not match with the terminal, so that the user uses the headset and the terminal more conveniently, thereby improving feeling of the user.

The apparatus or system embodiments are basically corresponding to the method embodiments, so reference can be made to the method embodiments for the relevant content. The described apparatus or system embodiments are merely exemplary. The units described as separate parts may or may not be physically separate, and parts displayed as units may or may not be physical units, may be located in one position, or may be distributed on a plurality of network elements. A part of or all of the modules may be selected according to actual needs to achieve the objectives of the solutions of the embodiments. Persons of ordinary skill in the art may understand and implement the application without creative efforts.

It should be understood that in the embodiments provided by this application, the disclosed system, apparatus and method may be implemented by other means without departing from the idea and scope of this application. The present embodiments are merely exemplary examples, and should not be construed as limitation. The given specific content should not limit the objectives of this application. For example, the units are merely divided according to logical functions and can be divided in other manners in actual implementation. For example, multiple units or multiple subunits are combined. In addition, multiple units or components may be combined or may be integrated to another system, or some features may be ignored or not performed.

In addition, the schematic diagrams describing the system, apparatus, method and different embodiments may be combined or integrated with other systems, modules, technologies or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical or other forms.

The foregoing description is merely about specific embodiments of this application. It should be noted by persons skilled in the art that modifications and variations may be made without departing from the principle of this application, and such modifications and variations should be construed as falling within the protection scope of this application.

What is claimed is:

1. A method for determining headset line sequence, wherein a headset comprises a headset plug and a headset line, one end of the headset plug is connected to the headset line of the headset, the headset plug is disposed with a first pin, a second pin, a third pin and a fourth pin sequentially from the other end of the headset plug to the one end connected to the headset line, a signal type of a signal transmitted by the first pin is a left sound channel signal, a signal type of a signal transmitted by the second pin is a right sound channel signal, wherein one of the third pin and the fourth pin are connected to a direct-current power supply to form a power supply branch, a bias resistor is connected onto the power supply branch in series, and a voltage of the direct-current power supply is a first voltage, the method comprising:

obtaining a second voltage between the third pin and the fourth pin, wherein the second voltage is a voltage obtained after dividing the first voltage, and the second voltage comprises a measured voltage across a diode placed in parallel across the third pin and the fourth pin;

comparing the obtained second voltage with a preset first threshold, and generating a comparison result; and according to the comparison result, determining a signal type of a signal transmitted by the third pin and a signal type of a signal transmitted by the fourth pin.

2. The method according to claim 1, wherein the one of the third pin and the fourth pin are connected to the direct-current power supply to form the power supply branch, the bias resistor is connected onto the power supply branch in series, and the voltage of the direct-current power supply is the first voltage specifically comprises:

when the third pin is connected to one end of the bias resistor, the other end of the bias resistor is connected to the direct-current power supply, the voltage of the direct-current power supply is the first voltage, and the fourth pin is grounded;

when the fourth pin is connected to one end of the bias resistor, the other end of the bias resistor is connected to the direct-current power supply, the voltage of the direct-current power supply is the first voltage, and the third pin is grounded.

3. The method according to claim 1, wherein the step of comparing the obtained second voltage with the preset first threshold and generating the comparison result comprises:

comparing the obtained second voltage with the preset first threshold, when the second voltage is greater than the first threshold, generating a first comparison result; when the second voltage is not greater than the first threshold, generating a second comparison result.

4. The method according to claim 3, wherein when the third pin is connected to one end of the bias resistor, the first comparison result is: determining that the signal type of the signal transmitted by the third pin is a microphone signal, and determining that the signal type of the signal transmitted by the fourth pin is a ground signal; the second comparison result is: determining that the signal type of the signal transmitted by the third pin is a ground signal, and determining that the signal type of the signal transmitted by the fourth pin is a microphone signal.

5. The method according to claim 3, wherein when the fourth pin is connected to one end of the bias resistor, the first comparison result is: determining that the signal type of the signal transmitted by the third pin is a ground signal, and determining that the signal type of the signal transmitted by the fourth pin is a microphone signal; the second comparison result is: determining that the signal type of the signal transmitted by the third pin is a microphone signal, and determining that the signal type of the signal transmitted by the fourth pin is a ground signal.

6. The method according to claim 1, further comprising:

according to the determined signal type of the signal transmitted by the third pin and the determined signal type of the signal transmitted by the fourth pin, matching corresponding electrical connection points to the third pin and the fourth pin, respectively.

7. The method according to claim 6, wherein the step of matching the corresponding electrical connection points to the third pin and the fourth pin respectively according to the determined signal type of the signal transmitted by the third pin and the determined signal type of the signal transmitted by the fourth pin comprises:

connecting the third pin to an electrical connection point that is in a headset matching device and matches with the signal type of the third pin, wherein the headset matching device is a device using a headset to perform audio output and/or audio input; and connecting the fourth pin to an electrical connection point that is in the headset matching device and matches with the signal type of the fourth pin.

8. The method according to claim 7, wherein the step of connecting the third pin to the electrical connection point that is in the headset matching device and matches with the signal type of the third pin comprises:
when the signal type of the signal transmitted by the third pin is a microphone signal, connecting the third pin to a microphone signal input point in the headset matching device; and
when the signal type of the signal transmitted by the third pin is a ground signal, connecting the third pin to a ground signal connection point in the headset matching device.

9. The method according to claim 7, wherein the step of connecting the fourth pin to the electrical connection point that is in the headset matching device and matches with the signal type of the fourth pin comprises:
when the signal type of the signal transmitted by the fourth pin is a microphone signal, connecting the fourth pin to a microphone signal input point in the headset matching device; and
when the signal type of the signal transmitted by the fourth pin is a ground signal, connecting the fourth pin to a ground signal connection point in the headset matching device.

10. An electronic device for determining headset line sequence, connected to a headset, wherein the headset comprises a headset plug and a headset line, one end of the headset plug is connected to the headset line of the headset, the headset plug is disposed with a first pin, a second pin, a third pin and a fourth pin sequentially from the other end of the headset plug to the one end connected to the headset line, a signal type of a signal transmitted by the first pin is a left sound channel signal, a signal type of a signal transmitted by the second pin is a right sound channel signal, wherein one of the third pin and the fourth pin are connected to a direct-current power supply to form a power supply branch, a voltage of the direct-current power supply is a first voltage, and the electronic device comprises: a bias resistor, a voltage measurement unit, a voltage comparison unit, and a line sequence determining unit, wherein
the bias resistor is connected onto the power supply branch in series;
the voltage measurement unit is connected between the third pin and the fourth pin, and is configured to obtain a second voltage between the third pin and the fourth pin, wherein the second voltage is a voltage obtained after dividing the first voltage, and the second voltage comprises a measured voltage across a diode placed in parallel across the third pin and the fourth pin;
the voltage comparison unit is connected to the voltage measurement unit, and is configured to compare the obtained second voltage with a preset first threshold, and generate a comparison result; and
the line sequence determining unit is connected to the voltage comparison unit, and is configured to, according to the comparison result, determine a signal type of a signal transmitted by the third pin and a signal type of a signal transmitted by the fourth pin.

11. The electronic device according to claim 10, wherein when the third pin is connected to one end of the bias resistor, the other end of the bias resistor is connected to the direct-current power supply, the voltage of the direct-current power supply is the first voltage, and the fourth pin is grounded;
when the fourth pin is connected to one end of the bias resistor, the other end of the bias resistor is connected to the direct-current power supply, the voltage of the direct-current power supply is the first voltage, and the third pin is grounded.

12. The electronic device according to claim 11, wherein the voltage comparison unit is specifically configured to:
compare the obtained second voltage with the preset first threshold, when the second voltage is greater than the first threshold, generate a first comparison result; when the second voltage is not greater than the first threshold, generate a second comparison result.

13. The electronic device according to claim 12, wherein when the third pin is connected to one end of the bias resistor, the first comparison result is: determining that the signal type of the signal transmitted by the third pin is a microphone signal, and determining that the signal type of the signal transmitted by the fourth pin is a ground signal; the second comparison result is: determining that the signal type of the signal transmitted by the third pin is a ground signal, and determining that the signal type of the signal transmitted by the fourth pin is a microphone signal.

14. The electronic device according to claim 12, wherein when the fourth pin is connected to one end of the bias resistor, the first comparison result is: determining that the signal type of the signal transmitted by the third pin is a ground signal, and determining that the signal type of the signal transmitted by the fourth pin is a microphone signal; the second comparison result is: determining that the signal type of the signal transmitted by the third pin is a microphone signal, and determining that the signal type of the signal transmitted by the fourth pin is a ground signal.

15. The electronic device according to claim 10, further comprising: a connection matching unit, connected to the line sequence determining unit and configured to, according to the determined signal type of the signal transmitted by the third pin and the determined signal type of the signal transmitted by the fourth pin, match corresponding electrical connection points to the third pin and the fourth pin, respectively.

16. The electronic device according to claim 15, wherein the connection matching unit comprises: a third pin matching subunit and a fourth pin matching subunit, wherein
the third pin matching subunit is configured to connect the third pin to an electrical connection point that is in a headset matching device and matches with the signal type of the third pin, wherein the headset matching device is a device using a headset to perform audio output and/or audio input; and
the fourth pin matching subunit is configured to connect the fourth pin to an electrical connection point that is in the headset matching device and matches with the signal type of the fourth pin.

17. The electronic device according to claim 16, wherein the third pin matching subunit is specifically configured to:
when the signal type of the signal transmitted by the third pin is a microphone signal, connect the third pin to a microphone signal input point in the headset matching device; and
when the signal type of the signal transmitted by the third pin is a ground signal, connect the third pin to a ground signal connection point in the headset matching device.

18. The electronic device according to claim 16, wherein the fourth pin matching subunit is specifically configured to:
when the signal type of the signal transmitted by the fourth pin is a microphone signal, connect the fourth pin to a microphone signal input point in the headset matching device; and when the signal type of the signal transmitted by the fourth pin is a ground signal, connect the fourth pin to a ground signal connection point in the headset matching device.

* * * * *